(12) United States Patent
Sorstrom et al.

(10) Patent No.: US 9,677,239 B2
(45) Date of Patent: Jun. 13, 2017

(54) MULTIPURPOSE TOOL FOR OIL SPILL CONTROL, PREFERABLY OFFSHORE

(71) Applicant: SINVENT AS, Trondheim (NO)

(72) Inventors: Stein Erik Sorstrom, Trondheim (NO); Ivar Singsaas, Tiller (NO)

(73) Assignee: Sinvent AS, Trondheim (NO)

( * ) Notice: Subject to any disclaimer, the term of this patent is extended or adjusted under 35 U.S.C. 154(b) by 0 days.

(21) Appl. No.: 14/428,687

(22) PCT Filed: Oct. 21, 2013

(86) PCT No.: PCT/NO2013/050177
§ 371 (c)(1),
(2) Date: Mar. 17, 2015

(87) PCT Pub. No.: WO2014/065673
PCT Pub. Date: May 1, 2014

(65) Prior Publication Data
US 2015/0218768 A1  Aug. 6, 2015

(30) Foreign Application Priority Data

Oct. 25, 2012  (NO) .................................. 20121250

(51) Int. Cl.
E02B 15/04 (2006.01)
B63B 35/32 (2006.01)
E02B 15/10 (2006.01)

(52) U.S. Cl.
CPC ............ *E02B 15/041* (2013.01); *B63B 35/32* (2013.01); *E02B 15/04* (2013.01); *E02B 15/045* (2013.01);

(Continued)

(58) Field of Classification Search
CPC combination set(s) only.
See application file for complete search history.

(56) References Cited

U.S. PATENT DOCUMENTS 3,270,706 A    9/1966 Muller
4,492,001 A    1/1985 Hedrenius
(Continued)

FOREIGN PATENT DOCUMENTS

JP   52-156093   11/1977
JP   7-274661    10/1995
(Continued)

OTHER PUBLICATIONS

International Search Report issued Jan. 22, 2014 in corresponding International Application No. PCT/NO2013/050177.
(Continued)

*Primary Examiner* — Kyle Armstrong
(74) *Attorney, Agent, or Firm* — Wenderoth, Lind & Ponack, L.L.P.

(57) ABSTRACT

A multipurpose tool (1) for oil spill control, preferably offshore, comprises a remotely controlled telescopic arm (5) having a first end (6) and a second end (7). The first end (6) is mounted on a vessel (25) and the second end (7) is provided with a quick-release coupling (8) for the fitting of various replaceable nozzles (15) thereto. The various replaceable nozzles (15) are connected to one or more hydraulic tubes (20) and tubes for supplying oil spill control agents and recovering collected oil.

6 Claims, 6 Drawing Sheets

(52) U.S. Cl.
CPC .......... *E02B 15/046* (2013.01); *E02B 15/047* (2013.01); *E02B 15/048* (2013.01); *E02B 15/10* (2013.01)

(56) References Cited

U.S. PATENT DOCUMENTS

| | | | | |
|---|---|---|---|---|
| 6,401,829 | B1* | 6/2002 | Newton | A62C 27/00 |
| | | | | 169/13 |
| 7,182,860 | B2* | 2/2007 | Lundin | E02B 15/106 |
| | | | | 210/173 |
| 8,087,342 | B1 | 1/2012 | Hall | |
| 2014/0319076 | A1* | 10/2014 | Galushko | B63G 8/001 |
| | | | | 210/747.6 |

FOREIGN PATENT DOCUMENTS

| | | |
|---|---|---|
| KR | 10-2004-0041924 | 5/2004 |
| WO | 2011/161448 | 12/2011 |
| WO | 2011/162978 | 12/2011 |

OTHER PUBLICATIONS

Norwegian Search Report issued May 25, 2013 in corresponding Norwegian Application No. 20121250.
Supplementary European Search Report dated May 13, 2016 in corresponding European Patent Application No. 13 84 9863.

* cited by examiner

MULTIPURPOSE TOOL FOR OIL SPILL CONTROL, PREFERABLY OFFSHORE

BACKGROUND OF THE INVENTION

1. Field of the Invention

The present invention relates to a multipurpose tool for oil spill control, preferably offshore.

More particularly, the invention relates to a tool to which different functions can be assigned for adaptation to the collection and treatment of oil spills under various conditions.

2. Description of Related Art

Oil spills in connection with discharges from the oil industry, shipping industry, etc. are a severe environmental problem which may lead to catastrophic consequences.

The alternatives presently available for handling such spills are principally the following:
1. the mechanical collection of oil on water,
2. the in-situ burning of oil on water, and
3. the chemical dispersion of oil on water.

U.S. Pat. No. 4,492,001 relates to a method for cleaning up oil spills as well as an arrangement for carrying out the method. Material sorbent to oil and similar products is blown out by means of an air current onto the oil via a spreading duct through a spreading opening. The sorbent material absorbs the oil and sorbent material is sucked up by means of a suction opening via a suction duct to a receptacle. The spreading duct or nozzle is switchable between spreading and sucking in the material.

JP S52156093 U discloses a vessel provided with tools for oil spill control comprising a telescopic arm having a first end mounted on a vessel and a second end supporting a suction nozzle, the nozzle being connected to a tube transporting oil back to the vessel.

JP H07274661 A discloses a vessel provided with tools for collecting material from a liquid surface, comprising a telescopic arm having a first end mounted on a vessel and a second end supporting a suction nozzle, the nozzle being connected to a tube transporting material back to the vessel.

The prior art methods and arrangements for handling oil spills, etc. are characterized in that they are rather specialized with respect to area of application and hence are not very flexible in handling varying conditions in connection with oil spills for which different types of oil spill control equipment are required.

SUMMARY OF THE INVENTION

Thus, an object of the present invention is to provide a flexible or multipurpose tool for controlling oil spills in varying conditions such as on water, in icy waters, coastal waters, etc. and in varying sea and weather conditions, i.e., the spill contingency tool shall be capable, in a simple and quick manner, of being adapted to various types of waters and areas of application.

A second object is that the multipurpose tool shall include one or more replaceable tanks/containers that can be replaced in a simple manner for the loading/unloading of oil/chemicals/absorbents, etc.

A third object is that the multipurpose tool shall be easily operable, e.g., by way of remote control from a bridge or portable control unit.

The objects of the present invention are achieved by a multipurpose tool for oil spill control, preferably offshore, comprising: a remotely controlled telescopic arm having a first end and a second end, the first end being mounted on a vessel, and further characterized in that the second end is provided with a quick-release coupling for the fitting of different replaceable nozzles thereto, the different nozzles being connected to one or more hydraulic tubes and tubes for supplying oil spill control agents and recovering collected oil, the tubes being connected to respective containers on the vessel.

BRIEF DESCRIPTION OF THE DRAWINGS

In the following, the present invention is explained by way of an exemplary embodiment shown in the attached drawings, in which.

DETAILED DESCRIPTION OF THE INVENTION

Figure 1:
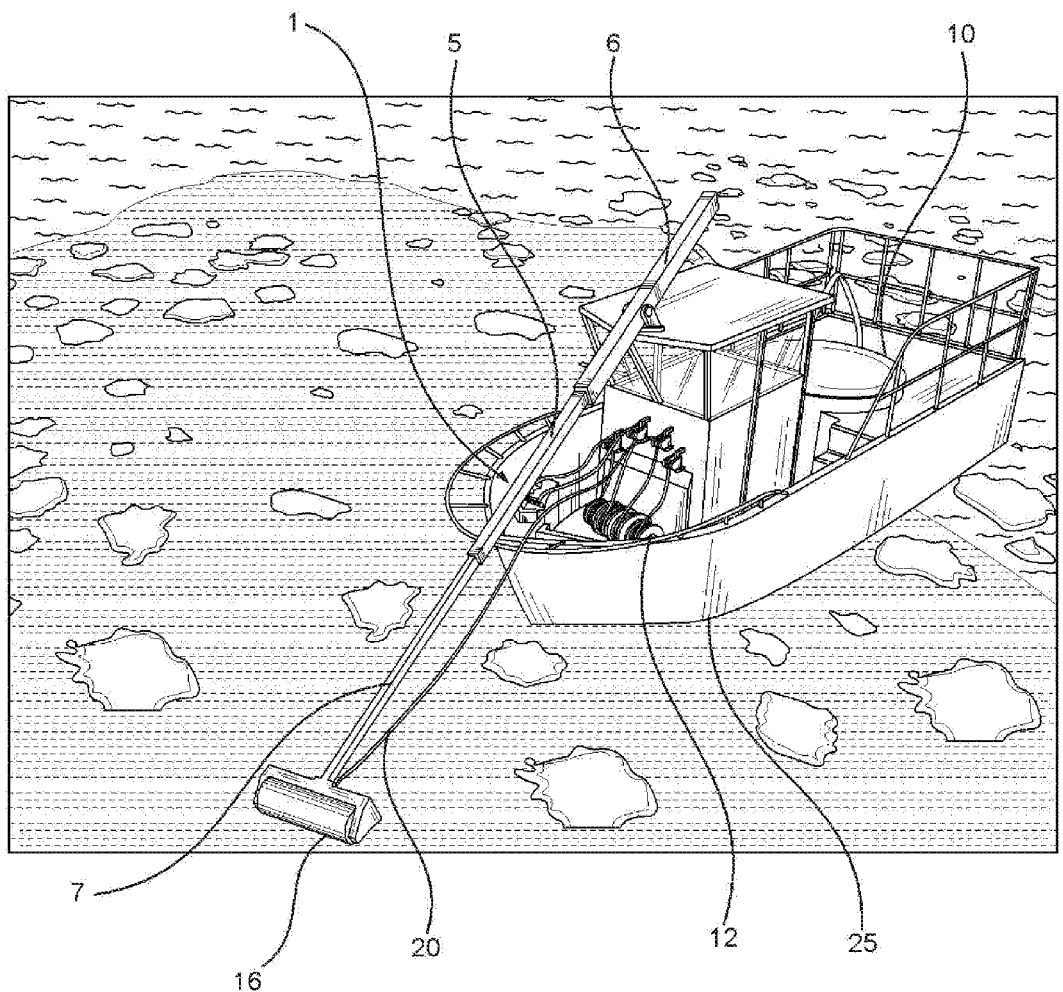
FIG. 1 shows a vessel provided with a multipurpose tool having mounted thereon a spill contingency tool in the form of a brush skimmer.
Figure 2:
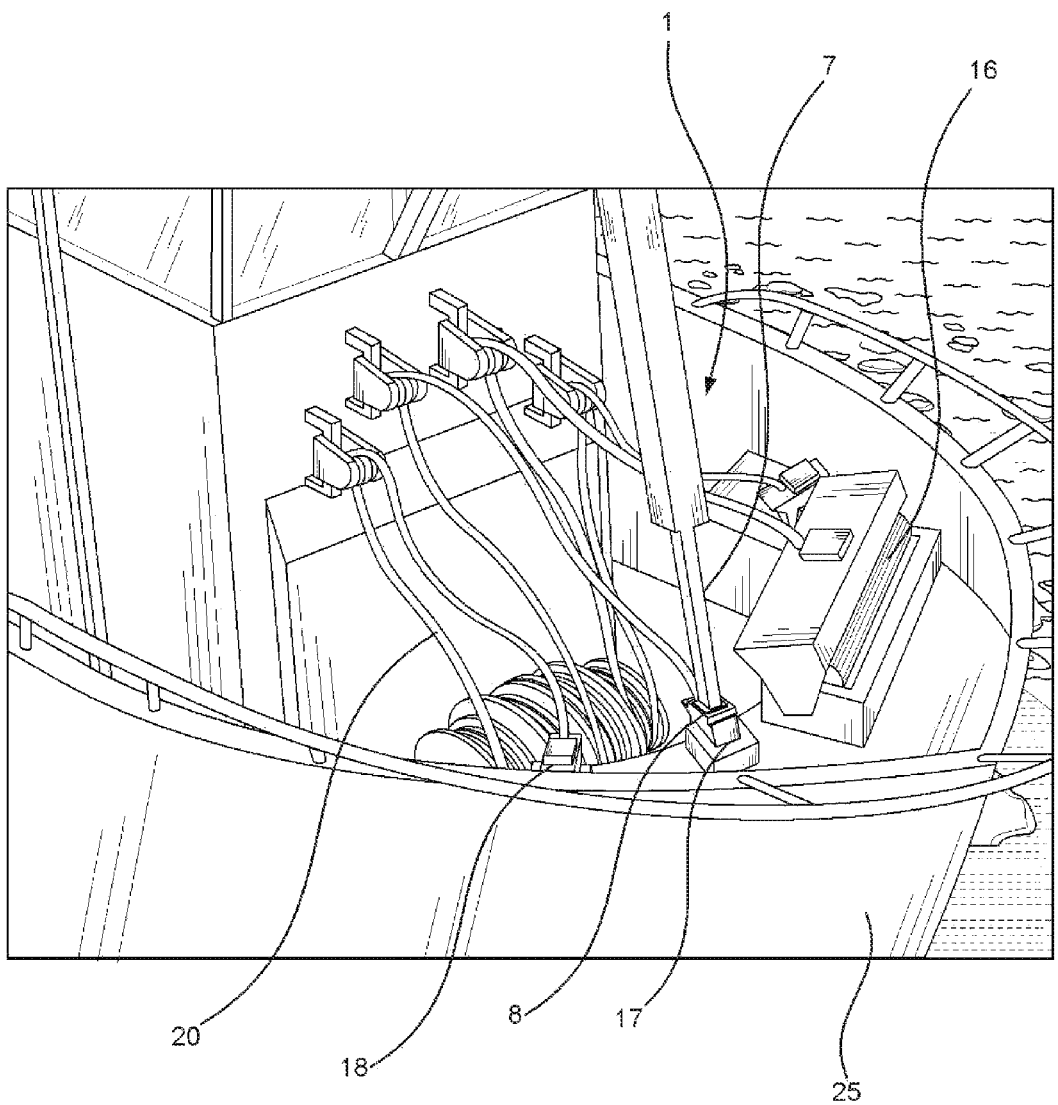
FIG. 2 shows the various replaceable spill contingency tools of the multipurpose tool provided on the vessel in more detail.

With reference to the drawings, a multipurpose tool 1 for oil spill control, preferably offshore, is shown. The multipurpose tool 1 comprises a remotely controlled telescopic arm 5 having a first end 6 and a second end 7. The first end 6 is mounted on a vessel 25. The second end 7 is provided with a quick-release coupling 8 for the fitting of various replaceable spill contingency tools or nozzles 15 thereto. The different nozzles 15 are connected to one or more hydraulic tubes 20 and tubes for supplying oil control agents and recovering the same together with oil.

Figure 3:
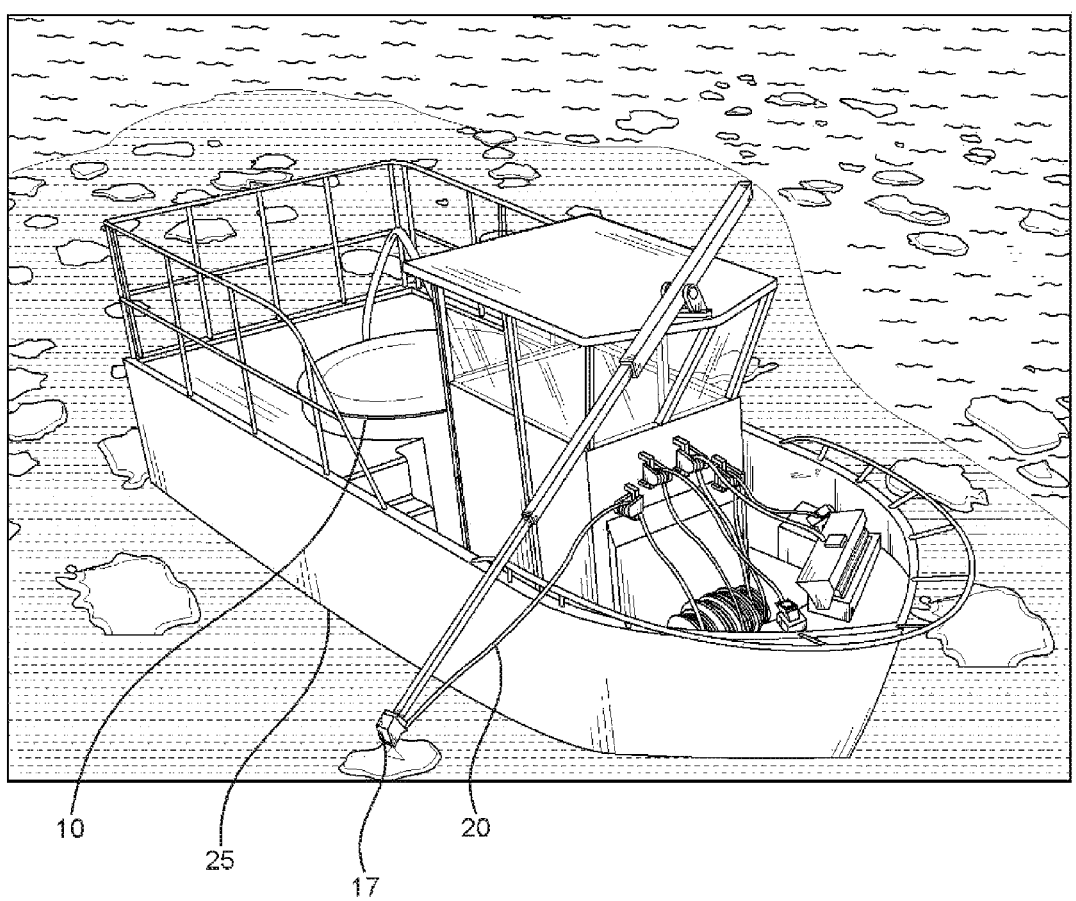
FIG. 3 shows the multipurpose tool with a spill contingency tool in the form of a dispersion tool mounted thereon.
Figure 4:
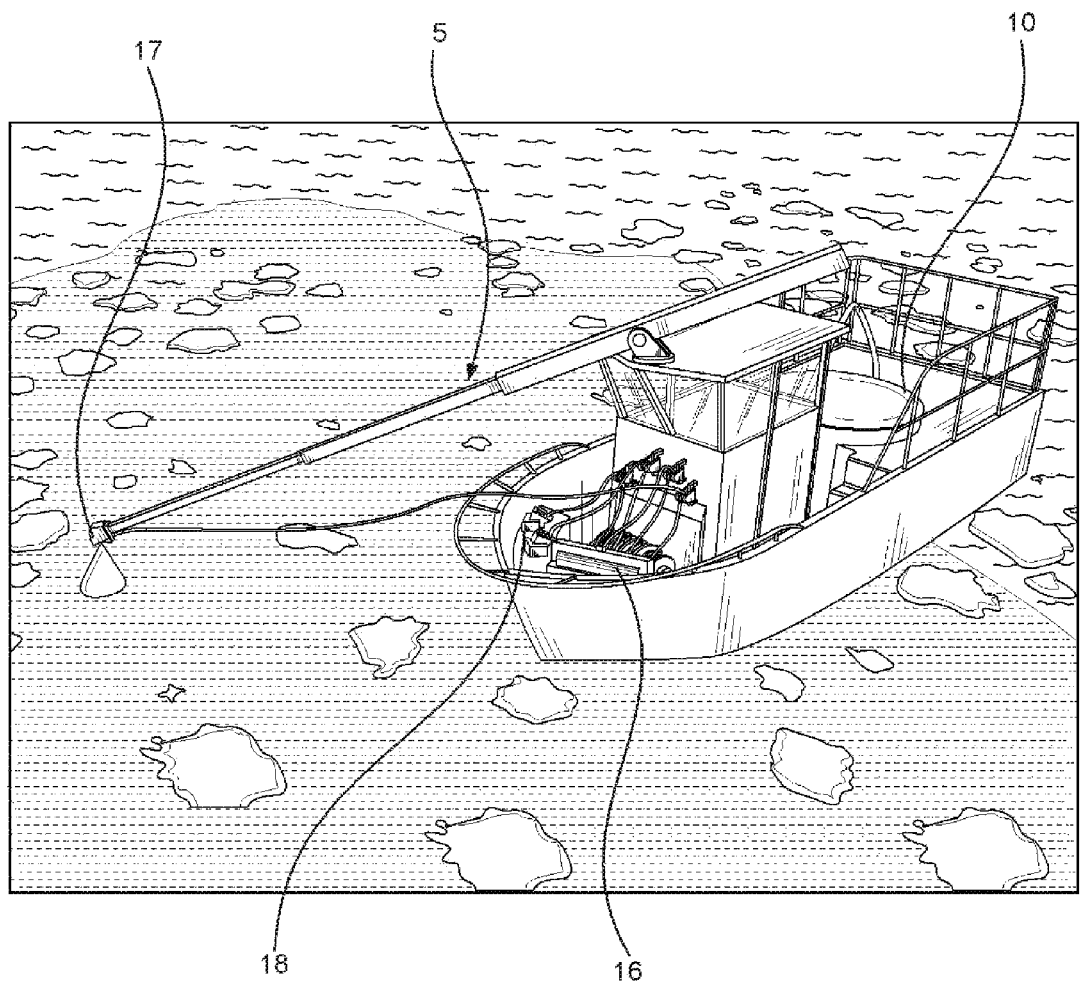
FIG. 4 shows the multipurpose tool of FIG. 3 in another working position.
Figure 5:
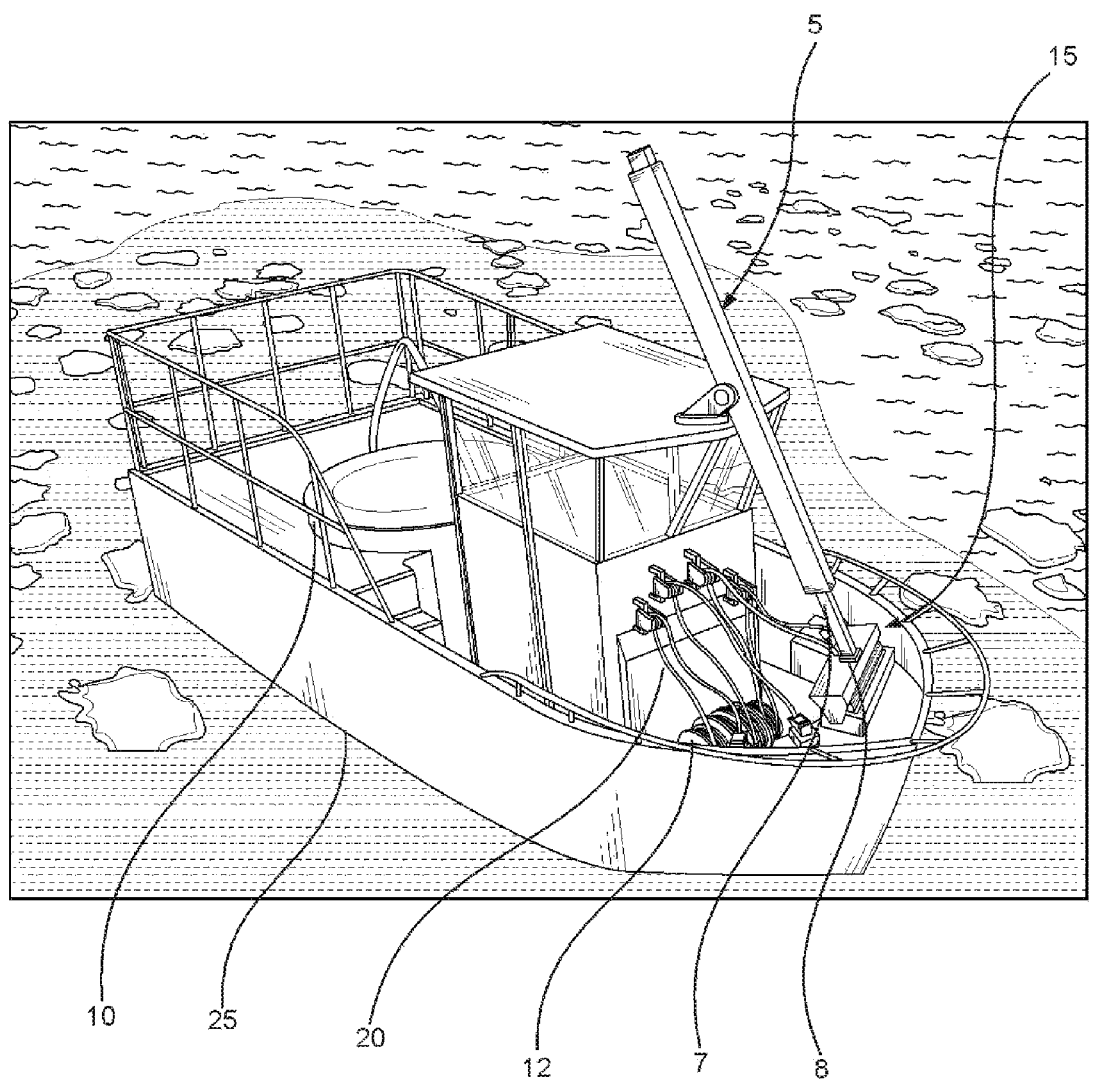
FIG. 5 shows the multipurpose tool in a non-operative configuration located on the deck of the vessel in connection with transport or during the replacement of spill contingency tools.
Figure 6:
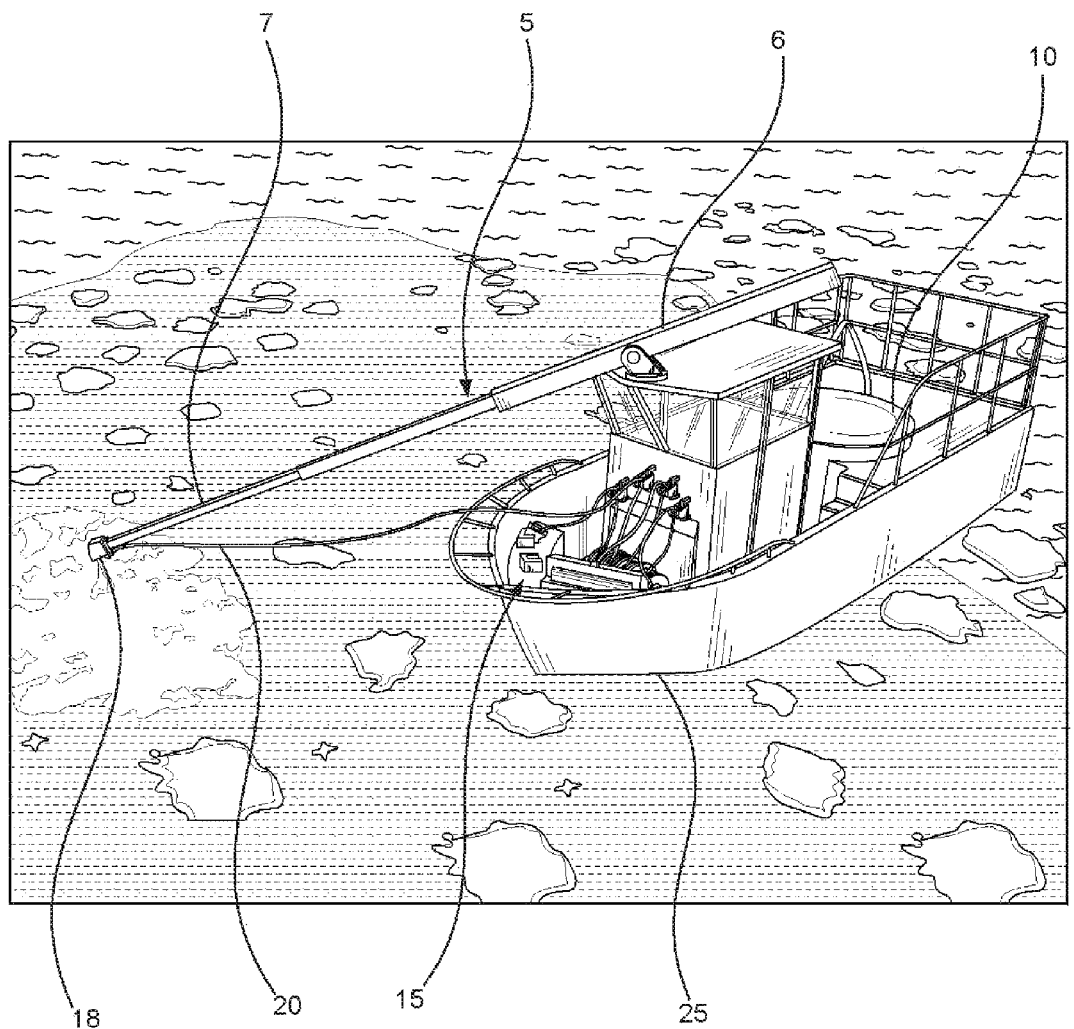
FIG. 6 shows the multipurpose tool having mounted thereon a spill contingency tool in the form of an oil spill control absorbent application system.

Nozzle 15 may be a brush skimmer 16 as shown, during operation, particularly in FIG. 1. Nozzle 15 could also be a dispersion tool 17 as shown, during operation, particularly in FIG. 3. As another alternative, the nozzle 15 could be an oil spill control absorbent application system 18, as shown particularly in FIG. 6.

Hydraulic tubes 20 and tubes for supplying oil spill control agents and recovering collected oil extend from nozzles 15 to one or more reel system(s) 12 located on vessel 25. A console is located on vessel 25 and is configured to organize one or more reel system(s) 12 located on the vessel 25. The hydraulic tubes 20 and tubes for supplying agents and recovering collected oil will be let out automatically when a nozzle 15 is connected. Tubes 20 for supplying oil spill control agents and recovering collected oil are also connected to respective containers 10 on vessel 25. The containers 10 are replaceable and include absorbents/chemicals and collected oil, respectively.

The telescopic arm 5 will be controllable from the bridge of the vessel or, alternatively, from a portable control unit. The different spill contingency tools or nozzles 15, as shown in the drawings, are located in the front section of the vessel. Hence, an operator of the multipurpose tool 1, in a quick and simple manner, is able to control or operate the telescopic arm 5 and connect to the selected nozzle 15 suitable for controlling the oil spill in the situation at hand. After the selected nozzle 15 has been connected, other necessary equipment, such as hydraulic tubes 20 and tubes for supplying oil spill control agents and recovering collected oil, for example, also will be operatively connected to nozzle 15. The operator may then maneuver the selected nozzle 15 to a desired location for controlling the oil spill. Depending on the type of nozzle used, oil, for example, can be collected and transported to the collection tank or container 10 of the vessel, or oil spill control agents can be fed to the oil slick and recovered to the vessel together with the oil.

It will be noted that nozzle 15 may also include other oil spill control tools than the one discussed above.

The invention claimed is:

1. A multipurpose tool for oil spill control, comprising:
   a console located on a vessel and configured to organize reel systems located on the vessel;
   a remotely controlled telescopic arm having a first end and a second end,
      wherein the first end is mounted on the vessel,
      wherein the second end is provided with a quick-release coupling for fitting of various replaceable nozzles thereto,
      wherein the various replaceable nozzles are connected to one or more hydraulic tubes and tubes for supplying oil spill control agents and recovering collected oil,
      wherein the one or more hydraulic tubes and tubes for supplying oil spill control agents and recovering collected oil extend from the reel systems and are connected to respective containers on the vessel,
   wherein the one or more hydraulic tubes and tubes for supplying oil spill control agents and recovering collected oil are configured to be automatically let out when one of the various replaceable nozzles is connected, and
   wherein the reel systems are configured to let out the hydraulic tubes and tubes for supplying oil spill control agents and recovering collected oil from the console.

2. The multipurpose tool of claim 1, wherein the containers are replaceable and include absorbents/chemicals and collected oil, respectively.

3. The multipurpose tool of claim 1, wherein at least one of the various replaceable nozzles is a brush skimmer.

4. The multipurpose tool of claim 1, wherein at least one of the various replaceable nozzles is a dispersion tool.

5. The multipurpose tool of claim 1, wherein at least one of the various replaceable nozzles is an oil spill control absorbent application system.

6. The multipurpose tool of claim 1, wherein the multipurpose tool is an offshore multipurpose tool.

* * * * *